(12) United States Patent
Sankaran et al.

(10) Patent No.: US 8,734,685 B2
(45) Date of Patent: May 27, 2014

(54) ELECTRICALLY CONDUCTING SYNTACTIC FOAM AND A PROCESS FOR PREPARING THE SAME

(75) Inventors: Sundaram Sankaran, Bangaluru (IN);
Samudra Dasgupta, Bangaluru (IN);
Ravi Sekhar Kandala, Bangaluru (IN);
Ravishankar Bare Narayana, Bangaluru (IN)

(73) Assignee: Director General, Defence Reserch & Development Organization, New Delhi (IN)

( * ) Notice: Subject to any disclaimer, the term of this patent is extended or adjusted under 35 U.S.C. 154(b) by 728 days.

(21) Appl. No.: 12/866,680

(22) PCT Filed: Feb. 9, 2009

(86) PCT No.: PCT/IB2009/000219
§ 371 (c)(1),
(2), (4) Date: Dec. 27, 2010

(87) PCT Pub. No.: WO2009/101498
PCT Pub. Date: Aug. 20, 2009

(65) Prior Publication Data
US 2011/0101284 A1    May 5, 2011

(30) Foreign Application Priority Data
Feb. 11, 2008   (IN) .............................. 352/DEL/2008

(51) Int. Cl.
*C08J 9/32* (2006.01)
*H01B 1/14* (2006.01)

(52) U.S. Cl.
USPC ........... 252/511; 252/502; 252/510; 523/218; 977/701; 977/734; 977/745; 977/753; 977/778; 977/779; 977/780; 977/783; 977/788; 977/932

(58) Field of Classification Search
USPC ........ 252/500–519.4; 523/218; 977/701, 734, 977/745, 753, 778, 779, 780, 783, 788, 932
See application file for complete search history.

(56) References Cited

U.S. PATENT DOCUMENTS

| | | | | |
|---|---|---|---|---|
| 3,622,825 | A | * | 11/1971 | Bennett .......................... 313/369 |
| 5,209,786 | A | * | 5/1993 | Rolfe et al. .................... 136/211 |
| 6,284,809 | B1 | * | 9/2001 | Plummer et al. ................. 521/54 |
| 6,905,667 | B1 | * | 6/2005 | Chen et al. .................. 423/447.1 |
| 2003/0104702 | A1 | * | 6/2003 | Wu ................................ 438/694 |
| 2003/0154865 | A1 | * | 8/2003 | Zornes ............................ 96/143 |
| 2004/0013865 | A1 | * | 1/2004 | Kotnis et al. ................ 428/304.4 |
| 2005/0072087 | A1 | * | 4/2005 | Fanucci et al. .................. 52/459 |
| 2006/0243363 | A1 | * | 11/2006 | Hunter et al. .............. 149/109.2 |
| 2007/0149626 | A1 | | 6/2007 | Cheung et al. |
| 2008/0296023 | A1 | * | 12/2008 | Willauer ....................... 166/302 |
| 2010/0264097 | A1 | * | 10/2010 | Sun et al. ...................... 210/767 |

FOREIGN PATENT DOCUMENTS

WO    2008/122373 A2    10/2008

OTHER PUBLICATIONS

Devi et al. ("Syntactic Foam Composites of Epoxy-Allyl Phenol-Bismaleimide Ternary Blend-Processing and Properties." J of Applied Polymer Sc, 105, pp. 3715-3722, Online Jun. 11, 2007).*
Li et al. ("A self-healing smart syntactic foam under multiple impacts." Composites Sc and Tech., 68, pp. 3337-3343, Online Sep. 15, 2008).*

* cited by examiner

*Primary Examiner* — Tri V Nguyen
(74) *Attorney, Agent, or Firm* — Sughrue Mion, PLLC

(57) ABSTRACT

The present invention relates to design and development of carbon nanotubes (CNT) reinforced electrically conducting synthetic foams comprising resin matrix system, carbon nanotubes, hollow glass microspheres and optionally hardener or catalyst for electrical conductivity and related applications especially electromagnetic interference (EMI) shielding.

11 Claims, No Drawings

ELECTRICALLY CONDUCTING SYNTACTIC FOAM AND A PROCESS FOR PREPARING THE SAME

FIELD OF INVENTION

The present invention provides an electrically conducting syntactic foam and process for preparing the same, designed for electrical conductivity and related applications.

BACKGROUND AND PRIOR ART

Syntactic foams are a special class of composite physical foams, wherein certain hollow microspheres are embedded in matrix binders so as to result in uniform and ordered arrangement of former. A wide variety of hollow microspheres are available, including cenospheres, glass microspheres, carbon and polymer microballoons. The matrix material can be selected from almost any metal, polymer or ceramics. One of the most widely used and studied syntactic foams consist of glass microballoons embedded polymeric binders. Unlike many other chemically synthesized polymeric types of foam, these syntactic foams have excellent mechanical and damping properties owing to the presence of embedded glass reinforcements. The applications of these foams are also widely known in the art. These were initially developed as buoyancy aid materials for marine and submarine applications. Thereafter, other characteristics led these materials to aerospace and ground transportation vehicle applications as well. Among the present applications, some of the common examples are buoyancy modules for marine drilling risers, boat hulls, and parts of helicopters and airplanes.

In U.S. Pat. No. 4,508,640, an electromagnetic wave-shielding material is disclosed. The material is comprised of one or more electromagnetic wave-shielding layers and one or more surface layers. The shielding layers are comprised of a thermoplastic resin, an aluminum or aluminum alloy and electrically conductive carbon black. However, it is very difficult to provide flame resistance to compositions containing large amounts of carbon black.

An electromagnetic interference (EMI) shielding composite is disclosed comprising of reinforcing fibers such as conductive fibers. Since conductive fibers and metallized glass fibers do not provide substantial reinforcement to the composite, it is generally necessary to add additional reinforcing fibers to obtain the desired physical properties. Consequently, the resulting composite is a highly dense material having poor moldability.

Another broadband EMI shielding nanocomposite material, comprising a low-melting metal alloy dispersed in a thermoplastic polymer and a process for making it is also known in the art. Weather-resistant electromagnetic radiation shielding materials and structures for electromagnetic interference attenuation for electronic equipment situated in unshielded outdoor housings have also been described.

Yet another shielding composition made with magnetic particles and a binder is disclosed in U.S. Pat. No. 5,938,979 where the magnetic particles have an average diameter less than about 1000 nm and are substantially crystalline Carbon nanotubes (CNT) one of the most promising exponents provides multifunctional reinforcements to the composite materials. These are essentially long graphene sheets wrapped in different angles (chiral angles) and with different circumferential lengths (chiral vector), depending upon which they are able to offer a wide range of mechanical, electrical and thermal properties.

However, none of the above described inventions have concentrated on exploiting the capabilities of CNT reinforced syntactic foams in the light of EMI shielding requirements and prospective uses as lightweight multifunctional core materials in subsequent sandwich constructions designed for the same purpose.

OBJECTS OF THE INVENTION

The primary objective of the invention is to provide electrically conducting syntactic foam for electrically conductive and related applications especially for EMI Shielding.

Another objective of the invention is to provide a process of tailoring the lightweight foam materials.

STATEMENT OF THE INVENTION

Accordingly, present invention provides an electrically conducting syntactic foam comprising:
(a) resin matrix system
(b) carbon nanotubes
(c) hollow glass microspheres, and
(d) optionally hardener/catalyst, fillers and additives.

Also, the present invention provides a process for preparing electrically conducting syntactic foam comprising following steps:
(a) homogeneously mixing 0-20% by weight of carbon nanotubes and 30-90% by weight of resin matrix under continuous stirring, with the addition of stoichiometric quantity of a hardener in case of epoxy resin, or with the addition of stoichiometric quantity of a catalyst mixture in case of cyanate ester resin;
(b) adding 10-60% by weight of glass hollow microspheres to the homogeneous mixture in step (a) to get an uniform dough;
(c) curing the dough at room temperature for about 24 hours, or at elevated temperatures in the range of 80-180° C. for about 2-4 hours and subsequent post curing at elevated temperatures in the range of 100-350° C. for about 2-4 hours depending upon the resin system to form a syntactic foam.

SUMMARY OF THE INVENTION

The present invention is in the field of nanotechnology enabled lightweight polymer composite foams for multifunctional requirements including electrical conductivity and EMI shielding applications. It relates to design and development of carbon nanotubes (CNT) reinforced electrically conducting, syntactic foams that are capable of being used as lightweight high strength core materials in composite sandwich panels designed for electrical conductivity and related applications, or as a light weight electrically conducting filler material in any structural construction and a process of preparing the same.

DETAILED DESCRIPTION

In today's age of miniaturisation, almost all electronic equipment designs have become extremely weight critical. Materials technology can greatly bolster the same by way of designing lightweight multifunctional composite materials for a wide range of applications including structural, EMI shielding ESD. So far, the technology of similar materials had been primarily dependent on the use of conductive polymers, which have their own limitations. However, with the advent of promising enabling technologies especially the nanotechnology and nanomaterials, the searches for alternative routes become increasingly interesting.

The present invention aims at the requirement of lightweight electrically conducting composite foams by way of process and material development leading to suitably tailored syntactic foams by judicious addition of CNTs in certain definite quantities, which may be used as conductive core materials for subsequent sandwich configuration designs or as light weight electrically conducting filler material in any design and construction.

Accordingly, the present invention provides an electrically conducting syntactic foam comprising:
(a) resin matrix system
(b) carbon nanotubes
(c) hollow glass microsphers, and
(d) optionally hardener/catalyst, fillers and additives.

One embodiment of the present invention, wherein the electrically conducting syntactic foam comprising 0-20% by weight of carbon nanotubes, 30-90% by weight of resin matrix and 10-60% by weight of glass hollow microspheres.

In one another embodiment of the present invention, wherein the said syntactic foam has the density in the range of 0.3 to 0.9 g/cc and the said syntactic foam is capable of withstanding temperatures up to 320° C.

Yet another embodiment of the present invention, wherein the said resin matrix system is selected from any thermosetting resin systems including epoxy, cyanate ester and polyester system or any other thermoplastic system prepared from PE, PP, PEEK, PC, PMMA and the like.

Still another embodiment of the invention, wherein said epoxy resin matrix is novolac or DGEBA based.

Yet another embodiment of the present invention, wherein said carbon nanotubes are single walled or multiwalled Still another embodiment of the invention, wherein said carbon nanotubes are functionalised carbon nanotubes.

Yet another embodiment of the present invention, wherein the said carbon nanotubes are having diameters in the range of 2-50 nm, length 100-200 nm 5-20 concentric shells in the case of multiwall carbon nanotubes.

Still another embodiment of the present invention, wherein the said glass hollow microspheres are having the diameter in the range of 30 to 200 microns Yet another embodiment of the present invention, wherein the said hardener system is aliphatic amines or aromatic di-amines in presence of epoxy resins.

Still another embodiment of the present invention, wherein the said aliphatic amines are selected from a group comprising diethylene triamine (DETA) or triethylene teramine (TETA)

Yet another embodiment of the present invention, wherein the said aromatic diamines are diamino diphenyl methane (DDM) or diamino diphenyl sulphone (DDS)

Still another embodiment of the present invention, wherein the said cyanate ester matrix is Bisphenol A or Bisphenol E or novolac based.

Yet another embodiment of the invention wherein the said catalyst formulation is based on transmission metal coordination compounds and co-catalyst of alkyl phenols in presence of cyanate ester matrices.

Further embodiment of the present invention, wherein a process for preparing electrically conducting syntactic foam comprising following steps:
(a) homogeneously mixing 0-20% by weight of carbon nanotubes and 30-90% by weight of resin matrix under continuous stirring, with the addition of stoichiometric quantity of a hardener in case of epoxy resin, or with the addition of stoichiometric quantity of a catalyst mixture in case of cynate ester resin;
(b) adding 10-60% by weight of glass hollow microspheres to the homogeneous mixture in step (a) to get an uniform dough;
(c) curing the dough at room temperature for about 24 hours, or at elevated temperatures in the range of 80-180° C. for about 2-4 hours and subsequent post curing at elevated temperatures in the range of 100-350° C. for about 2-4 hours depending upon the resin system to form a syntactic foam.

The matrices used in the foams described in the subsequent examples were either epoxy (novolac and DGEBA based) or cyanate ester systems. However, the same concepts may be easily extended for any other thermosetting polymeric resin like phenolics, polyesters, polyimides etc, and thermoplastic matrices viz, PE, PP, PEEK, PC, PMMA and the like. The hardener systems used for epoxy resins were aliphatic amines such as Diethylene Triamine (DETA), Triethylene Tetramine (TETA) etc. and aromatic di-amines such as Diamino diphenyl methane (DDM), Diamino diphenyl sulphone (DDS) etc. in the weight fraction of 0.1 to 0.4, while no hardener/catalyst was used for cyanate ester systems. The hollow microspheres essentially comprise of thin walled (micron level) hollow glass balloons having external diameters from 30 microns to 200 microns. The CNTs may be of different types, singlewall or multiwall; crude or purified; open ended or capped; functionalised or as produced etc.

Process: The suitable variety and quantities of CNTs are dispersed in the matrix resin by employing appropriate methods like manual mixing, shear homogenisation, ultrasonication etc. Following this, the hardener/catalyst (if any) is to be added and uniformly mixed under appropriate conditions, as per the nature of resin system chosen. Thereafter, the microballoons are to be added in lots with gentle mixing till a workable dough results. The dough is to be filled in a rectangular mould and the green foam is then cured and post cured at appropriate temperature depending on the resin system. Proper care must be taken to ensure homogenisation of the entire mix/dough, at the same time, proper caution need to be employed to minimize the possibility of the breakages of microspheres during this process.

Properties: Depending upon the choice of raw materials, composition and cure schedule, the electrically conducting syntactic foam will offer the following range of properties:
Density: 0.3 to 0.9 g/cc
Electrical Resistivity: $10^0$ Ohm-cm to $10^{10}$ ohm-cm
EMI Shielding Effectiveness (SE): 0 to 40 dB from 100 kHz to 1 GHz
Storage Modulus at Room Temperature: 0.5 to 2.0 GPa
Glass Transition Temperature (Tg): up to 320° C.

WORKING EXAMPLES

E.g. 1

Multiwall CNT Reinforced Room Temperature Curable Epoxy Syntactic Foam

Aim: Reinforced syntactic foam
Raw Materials The matrix used to fabricate the composite was room temperature curing epoxy (novolac based)—cyclo aliphatic amine hardener system (100:38 by weight). The hollow glass microspheres used in the syntactic foams were having diameters ranging from 45 to 175 microns. The multiwall CNTs (75% purity) used in these composites have a diameter of 2-15 nm, length of 100-2000 nm with 5-20 concentric shells.

Process: The CNTs (1.67 gms, 15% by wt. of the foam) were added to the epoxy resin (4.54 gms) at room temperature and stirred manually till homogenous mixture was obtained. Thereafter, the hardener (1.70 gms) was added to the mixture and mixed thoroughly, before adding the glass microspheres. The microspheres (3.39 gms) were carefully mixed to attain a homogenous mixture before rolling the dough into the mold cavity. The foams were cured at room temperature for 24 hours, before being post cured at 120° C. for three hours.

Properties: The following are some of the observed properties of the above-described foam (Table 2):
Density: 0.50 g/cc
Electrical Resistivity Insulating (No Percolation)
Storage Modulus at Room Temperature: 1.5 GPa
Glass Transition Temperature (Tg): 129° C.

Example 2

Singlewall CNT Reinforced Room Temperature Curable Epoxy Syntactic Foam

Aim: Lightweight syntactic foam with superior electrical conductivity and rigidity properties (as compared to the foam described in Example 1)

Raw Materials Same as 1, except that the CNT used was singe walled type (20% purity), having a diameter of 1.2-1.4 nm, length of 5-100 nm Process: The singlewall CNTs (1.07 gms, 10% by wt. of the foam) were added to the epoxy resin (4.64 gms) at room temperature and stirred manually till homogenous mixture was obtained. Thereafter, the hardener (1.81 gms) was added to the mixture and mixed thoroughly, before adding the glass microspheres. The microspheres (3.36 gms) were carefully mixed to attain a homogenous mixture before rolling the dough into the mold cavity. The foams were cured at room temperature for 24 hours, before being post cured at 120° C. for three hours.

Properties: The following are some of the observed properties of the above-described foam (Table 2):
Density: 0.52 g/cc
Electrical Resistivity: 2.95×10² Ohm-cm
Storage Modulus at Room Temperature: 1.8 GPa Example 3

Amine Functionalised Multiwall CNT Reinforced Elevated Temperature Curable Epoxy Syntactic Foam Aim: Higher glass transition temperature and superior mechanical properties at much lesser loading of CNTs Raw Materials The matrix used to fabricate the composite was an elevated temperature curing epoxy (DGEBA based)— aromatic amine hardener system (100:27 by weight). The hollow glass microspheres used in the syntactic foams were having diameters ranging from 45 to 175 microns. The multiwall amine terminated CNTs (95% purity) used in these composites have a diameter of 4 (ID)-50 (OD) nm, length of up to 15 microns with 5-20 concentric shells.

Process: The powdered hardener (8.20 gms) was added to the resin (31.28 gms) at 90-95° C. and dissolved completely. Thereafter, the multiwall CNTs (1.35 gms, 2.2% by wt. of the foam) were added to the epoxy system at room temperature and stirred manually till homogenous mixture was obtained. The microspheres (21.03 gms) were then carefully mixed to attain homogenous dough before rolling it into the mold cavity. The foam was cured at 100° C. for four hours, before being post cured at 160° C. for three hours.

Properties: The following are some of the observed properties of the above-described foam:
Density: 0.50 g/cc
Electrical Resistivity: 7.2×10² Ohm-cm
Storage Modulus at Room Temperature: 1.5 GPa
Glass Transition Temperature (Tg): 174° C.

Example 4

Homogenised and Amine Functionalised Multiwall CNT Reinforced Elevated Temperature Curable Epoxy Syntactic Foam Aim: Effect of shear homogenisation of the CNTs in the matrix Raw Materials & Process: Same as in E.g. 3, except that the CNTs were homogenised in the matrix resin by a shear disperser (@10,000 rpm for 30 mins). This was aimed to ensure maximum deagglomeration of the entangled CNTs in the composite foam.

Properties: The following are some of the observed properties of the above-described foam:
Electrical Resistivity: 7.0×10² Ohm/cm
Storage Modulus at Room Temperature: 1.7 GPa
Glass Transition Temperature (Tg): 179° C.

Example 5

Amine Functionalised Multiwall CNT Reinforced Cyanate Ester Syntactic Foam

Aim: Higher $T_g$
Raw Materials & Process: Same as in Example 4, except that the resin used was a Bisphenol E Dicyanate ester system.

Properties: The following are some of the observed properties of the above-described foam:
Glass Transition Temperature (Tg): 320° C.

Example 6

Amine Functionalised Multiwall CNT Reinforced Low Density Syntactic Foam

Aim: Nanocomposite foam of relatively lower density
Raw Materials Same as Example. 3.

Process: The powdered hardener (8.80 gms) was added to the resin (32.60 gms) at 90-95° C. and dissolved completely. Thereafter, the multiwall CNTs (1.97 gms, 2.2% by wt. of the foam) were added to the epoxy system at room temperature and stirred manually till homogenous mixture was obtained. The microspheres (48.00 gms) were then carefully mixed to attain homogenous dough before rolling it into the mold cavity. The foam was cured at 100° C. for four hours, before being post cured at 160° C. for three hours.

Properties: The following are some of the observed properties of the above-described foam:
Density: 0.30 g/cc
Electrical Resistivity: 1.6×10⁴ Ohm-cm
Storage Modulus at Room Temperature: 0.75 GPa
Glass Transition Temperature (Tg): 174° C.

Example 7

Amine Functionalised Multiwall CNT Reinforced High Density Syntactic Foam

Aim: Nanocomposite foam of relatively higher density
Raw Materials Same as Example 3
Process: The powdered hardener (33.56 gms) was added to the resin (124.28 gms) at 90-95° C. and dissolved completely. Thereafter, the multiwall CNTs (3.96 gms, 2.2% by wt. of the foam) were added to the epoxy system at room temperature and stirred manually till homogenous mixture was obtained. The microspheres (22.29 gms) were then carefully mixed to attain homogenous dough before rolling it into the mold cavity. The foam was cured at 100° C. for four hours, before being post cured at 160° C. for three hours.

Properties: The following are some of the observed properties of the above-described foam:
Density: 0.81 g/cc
Electrical Resistivity: $9.1 \times 10^4$ Ohm-cm
Storage Modulus at Room Temperature: 1.88 GPa
Glass Transition Temperature (Tg): 175° C.

Advantages
1. Lightweight, high rigidity, electrically conducting thermosetting syntactic foam materials is obtained.
2. Tailoring the insulating syntactic foam compositions for electrical conductivity & strength properties by addition of suitable quantity of CNTs of suitable grade, purity and functionalisation.
3. Matrix binder is chosen for desired temperature with standability without compromising on any of the functional properties of the materials
4. The improved characteristics of the present invention over the conventional syntactic foam systems are shown through Table 1 and Table 2.

Application

The electrically conducting lightweight syntactic foams will find applications as lightweight high strength conducting core materials in sandwich panels (with conducting/insulating stiffened face sheets) designed for EMI shielding and ESD applications in consumer electronic goods (like domestic/industrial microwave oven chassis, telecom equipments etc.) and also as light weight filler material in design and construction of engineering systems.

TABLE 1

Properties of Conventional Fabricated syntactic foam

| Sl. No. | CNT Type | Loading Wt. % | Density g/cc | Electrical Resistivity Ohm-cm | Ambient Temp. SM* GPa | Remarks |
|---|---|---|---|---|---|---|
| 01 | — | Zero (No CNT) | 0.48 | $10^9$ | 1.2 | Conventional insulating syntactic foam |

*SM—Storage Modulus (Measured by DMA)

TABLE 2

Properties of Fabricated syntactic foam of the present Invention

| Sl. No. | CNT Type | Loading Wt. % | Density g/cc | Electrical Resistivity Ohm-cm | Ambient Temp. SM GPa | Remarks |
|---|---|---|---|---|---|---|
| 01 | MWNT | 15 | 0.50 | $>10^7$ | 1.5 | Minor increase in dynamic storage modulus, no improvements in electrical conductivity even at 15 wt. % loading |
| 02 | SWNT | 10 | 0.52 | $10^2$ | 1.8 | Reasonable improvement in SM, sudden drop in electrical resistivity at a very high loading of 10 wt. % |
| 03 | MWNT (Functionalized & homogenized) | 0.5 | 0.48 | $10^8$ | 1.6 | Reasonable improvement in SM but no electrical percolation |
| 04 | MWNT (Functionalized & | 1 | 0.48 | $10^4$ | 1.6 | Reasonable improvement in SM and electrical |

TABLE 2-continued

Properties of Fabricated syntactic foam of the present Invention

| Sl. No. | CNT Type | Loading Wt. % | Density g/cc | Electrical Resistivity Ohm-cm | Ambient Temp. SM GPa | Remarks |
|---|---|---|---|---|---|---|
| | homogenized) | | | | | percolation observed at very low loading of 1 wt. % |
| 05 | MWNT (Functionalized & homogenized) | 2 | 0.48 | $10^2$ | 1.7 | Very low electrical conductivity at a minimum 2 wt. % loading of CNTs |

We claim:

1. An electrically conducting syntactic foam comprising:
   (a) 30-90% by weight of a resin matrix system
   (b) 0.5-20% by weight of functionalized carbon nanotubes
   (c) 10-60% by weight of hollow glass microspheres,
   (d) optionally hardener/catalyst, fillers and additives
   wherein the said resin matrix system is selected from the group comprising novolac epoxy resin matrix, Bisphenol A diglycidyl ether (DGEBA) based epoxy resin matrix and cyanate ester resin matrix based on Bisphenol A or Bisphenol E or novolac based.

2. The syntactic foam as claimed in claim 1, wherein the said syntactic foam has the density in the range of 0.3 to 0.9 g/cc and the said syntactic foam is capable of withstanding temperatures upto 320° C.

3. The syntactic foam as claimed in claim 1, wherein the said resin matrix system comprises fillers and additives are selected from flexibilises, tougheners, pigments.

4. The syntactic foam as claimed in claim 1, wherein the said functionalized carbon nanotubes are single walled or multiwalled.

5. The syntactic foam as claimed in claim 1, wherein the said functionalized carbon nanotuhes are having diameters in the range of 2-50 nm, length 100-200 nm and 5-20 concentric shells in the case of multiwall functionalized carbon nanotubes.

6. The syntactic foam as claimed in claim 1, wherein the said glass hollow microspheres are having the diameter in the range of 30 to 200 microns.

7. The syntactic foam as claimed in claim 1, wherein the said hardener system is aliphatic amines or aromatic di-amines in presence of epoxy resins.

8. The syntactic foam as claimed in claim 7, wherein the said aliphatic amines are selected from a group comprising diethylene triamine (DETA) or triethylene teramine (TETA).

9. The syntactic foam as claimed in claim 7, wherein the said aromatic diamines are diamino diphenyl methane (DDM) diamino diphenyl sulphone (DDS).

10. The syntactic foam as claimed in claim 1, wherein the said catalyst is based on the transition metal compounds and co catalyst of alkyl phenols in presence of cyanate ester matrices.

11. The syntactic foam as claimed in claim 1, wherein the said hardener is added in the range of 10-40% by weight of the resin in case of epoxy resins.

* * * * *